US012605888B2

(12) United States Patent
Hartman et al.

(10) Patent No.: US 12,605,888 B2
(45) Date of Patent: Apr. 21, 2026

(54) THREE-DIMENSIONALLY PRINTED LENS ELEMENTS

(71) Applicant: PERIDOT PRINT LLC, Palo Alto, CA (US)

(72) Inventors: Aja Hartman, Palo Alto, CA (US); Michelle Niu, Palo Alto, CA (US); Adekunle Olubummo, Palo Alto, CA (US); Kyle Wycoff, Palo Alto, CA (US); Krzysztof Nauka, Palo Alto, CA (US); Emre Hiro Discekici, San Diego, CA (US)

(73) Assignee: Peridot Print LLC, Palo Alto, CA (US)

( * ) Notice: Subject to any disclaimer, the term of this patent is extended or adjusted under 35 U.S.C. 154(b) by 140 days.

(21) Appl. No.: 18/569,598

(22) PCT Filed: Jun. 24, 2021

(86) PCT No.: PCT/US2021/038901
§ 371 (c)(1),
(2) Date: Dec. 12, 2023

(87) PCT Pub. No.: WO2022/271177
PCT Pub. Date: Dec. 29, 2022

(65) Prior Publication Data
US 2024/0269922 A1 Aug. 15, 2024

(51) Int. Cl.
B29C 64/165 (2017.01)
B29C 64/188 (2017.01)
(Continued)

(52) U.S. Cl.
CPC .......... B29C 64/165 (2017.08); B29C 64/188 (2017.08); B29C 64/264 (2017.08);
(Continued)

(58) Field of Classification Search
CPC ... B29C 64/165; B29C 64/264; B29C 64/188; B33Y 10/00; B33Y 30/00; B33Y 80/00; B33Y 40/20; B29D 11/00923
See application file for complete search history.

(56) References Cited

U.S. PATENT DOCUMENTS

2008/0033079 A1* 2/2008 Costanzi ................. C08K 3/32
                                                      524/414
2012/0082834 A1* 4/2012 Wermter ................... C08J 5/18
                                                      428/339

(Continued)

FOREIGN PATENT DOCUMENTS

CN        105431283 B    9/2019
WO        2020/251661 A1  12/2020

OTHER PUBLICATIONS

Liu et al., "Effect of Drying on Particle Size and Sensitivities of Nano hexahydro-1,3,5-trinitro-1,3,5-triazine" Defence Technology, vol. 10, Issue 1, Mar. 2014, pp. 9-16 (Year: 2014).*

*Primary Examiner* — Nahida Sultana
(74) *Attorney, Agent, or Firm* — Dierker & Kavanaugh, P.C.

(57) ABSTRACT
A three-dimensional printing kit for forming lens elements can include a build material including from about 80 wt % to 100 wt % thermoplastic polyamide elastomeric particles having a D50 particle size from about 10 μm to about 150 μm, and a fusing agent including a liquid vehicle and from about 0.5 wt % to about 20 wt % of a UV radiation absorber.

15 Claims, 3 Drawing Sheets

(51) Int. Cl.

| | |
|---|---|
| *B29C 64/264* | (2017.01) |
| *B29D 11/00* | (2006.01) |
| *B29K 21/00* | (2006.01) |
| *B29K 77/00* | (2006.01) |
| *B29K 105/00* | (2006.01) |
| *B29L 11/00* | (2006.01) |
| *B33Y 10/00* | (2015.01) |
| *B33Y 30/00* | (2015.01) |
| *B33Y 40/20* | (2020.01) |
| *B33Y 70/00* | (2020.01) |
| *B33Y 80/00* | (2015.01) |

(52) U.S. Cl.
CPC .. *B29D 11/00451* (2013.01); *B29D 11/00923* (2013.01); *B33Y 10/00* (2014.12); *B33Y 30/00* (2014.12); *B33Y 40/20* (2020.01); *B33Y 70/00* (2014.12); *B33Y 80/00* (2014.12); *B29K 2021/003* (2013.01); *B29K 2077/00* (2013.01); *B29K 2105/0032* (2013.01); *B29K 2105/251* (2013.01); *B29K 2995/0012* (2013.01); *B29K 2995/0088* (2013.01); *B29L 2011/0016* (2013.01)

(56) References Cited

U.S. PATENT DOCUMENTS

| | | | | |
|---|---|---|---|---|
| 2014/0066560 A1* | 3/2014 | Stoppelmann | ........... | C08K 3/40 |
| | | | | 524/407 |
| 2019/0054690 A1* | 2/2019 | Feng | ...................... | B33Y 40/10 |
| 2019/0137664 A1 | 5/2019 | Stasiak | | |
| 2020/0299459 A1* | 9/2020 | Ehlis | ...................... | A61K 8/496 |
| 2021/0016496 A1 | 1/2021 | Chen et al. | | |

* cited by examiner

300 — iteratively applying individual polymer build material layers including from about 80 wt% to 100 wt% thermoplastic polyamide elastomeric particles having a D50 particle size from about 10 μm to about 150 μm to a powder bed    — 310 based on a three-dimensional object model, iteratively and selectively dispensing a fusing agent onto the individual build material layers, wherein the fusing agent includes an aqueous liquid vehicle and from about 0.5 wt% to about 20 wt% of a UV-absorbing radiation absorber, wherein the fusing agent exhibits an absorbance from about 0.3 to 2 at a radiation wavelength from about 340 nm to about 415 nm    — 320 iteratively exposing the powder bed to electromagnetic radiation that includes the radiation wavelength at an energy level from about 2 W/cm$^2$ to about 50 W/cm$^2$ for a time duration of about 0.1 second to about 10 seconds to selectively fuse the thermoplastic polyamide elastomeric particles in contact with the UV-absorbing radiation absorber at the individual build material layers resulting in a transparent or translucent lens element    — 330

FIG. 3

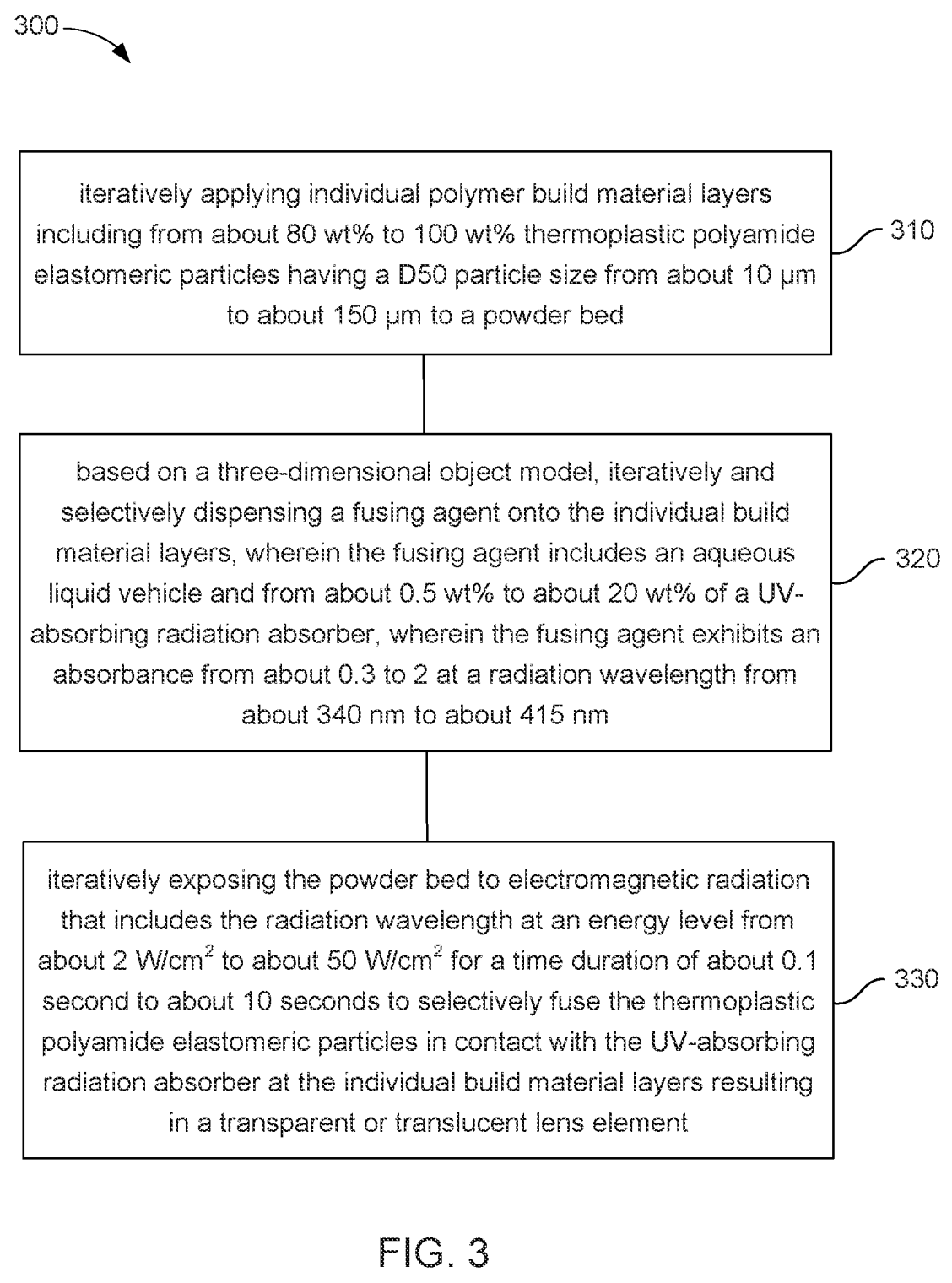

THREE-DIMENSIONALLY PRINTED LENS ELEMENTS

BACKGROUND

Methods of three-dimensional (3D) digital printing, a type of additive manufacturing, have continued to be developed over the last few decades. In general, three-dimensional printing technology can change the product development cycle by allowing rapid creation of prototype models or even finished products. For example, several commercial sectors such as aviation and the medical industry, to name a few, have benefitted from rapid prototyping and/or the production of customized parts. There are various methods for three-dimensional printing that have been developed, including heat-assisted extrusion, selective laser sintering, photolithography, additive manufacturing, as well as others. As technology advances, higher demands with respect to production speed, part consistency, rigidity, method flexibility, etc., are requested by customers. For example, lens manufacturing can provide opportunities in industries that use optical components, including lenses used for cameras usable in many diverse industries, e.g., self-driving-automobiles, unmanned aircraft, automation, monitoring, etc.

BRIEF DESCRIPTION OF THE DRAWINGS

FIG. 3 is a flow diagram illustrating example methods for three-dimensional printing in accordance with the present disclosure.

DETAILED DESCRIPTION

Figure 1:
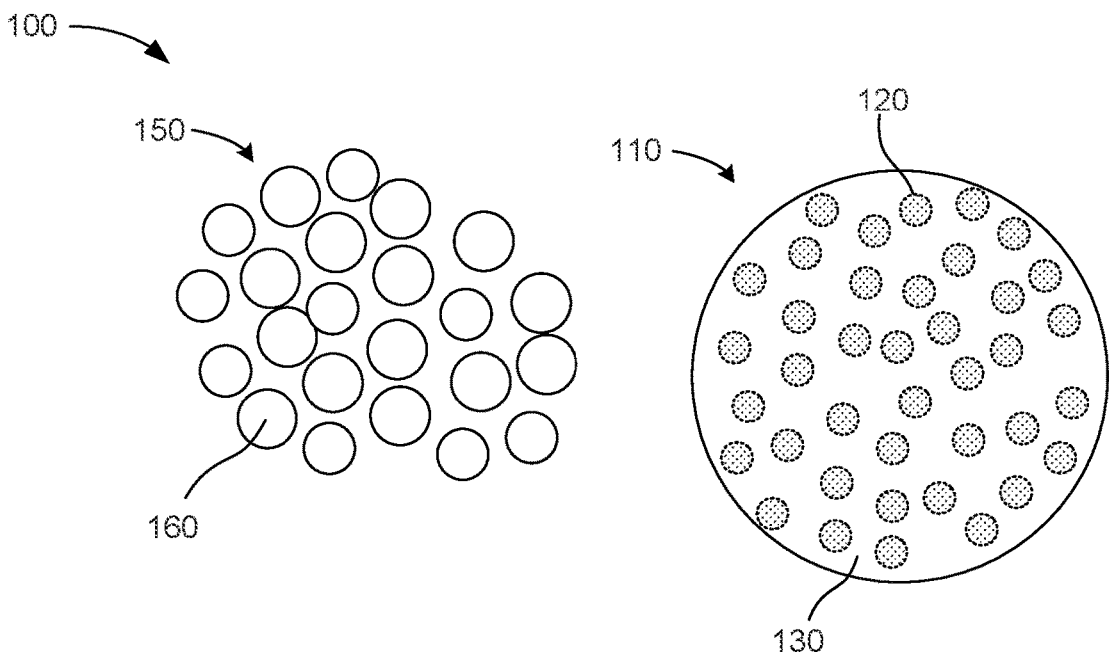
FIG. 1 schematically illustrates example three-dimensional printing kits in accordance with the present disclosure.

Three-dimensional printing can be used to make any of a number of objects. In particular, some three-dimensional printing technologies can be used efficiently to form objects suitable for optics, such as lens elements. To illustrate, various lenses of a variety of shapes, sizes, magnification, type, color, etc., can be manufactured using the three-dimensional printing kits, systems, methods, etc., of the present disclosure. In some examples, lens elements prepared as described herein can be manufactured to be used as part of lens assemblies and/or can be manufactured with sufficient ductility to be mechanically deformable for use in industries where adaptive optics can be beneficial, e.g., astronomy, military, binoculars, telescopes, magnification optics, etc., and/or for removing undesirable distortions.

A three-dimensional printing kit suitable for the manufacture of lenses, for example, can include a build material including from about 80 wt % to 100 wt % thermoplastic polyamide elastomeric particles having a D50 particle size from about 10 μm to about 150 μm, and a fusing agent including a liquid vehicle and from about 0.5 wt % to about 20 wt % of a UV radiation absorber. In some examples, the fusing agent can exhibit an absorbance from about 0.3 to about 2 at a wavelength from about 340 nm to about 415 nm. Example UV-absorbing fusing agents include triazine radiation absorbers, such as 2,4-bis(2,4-dimethylphenyl)-6-(2- hydroxy-4-octyloxyphenyl)-1,3,5-triazine, 2,4-bis(2,4-dimethylphenyl)-6-(2-hydroxy-4-isooctyloxyphenyl)-1,3,5-triazine, 2,4-bis(2,4-dimethyl phenyl)-6-(2-hydroxy-4-methoxy phenyl)1,3,5-triazine, 2-(2-hydroxy-4-hexyloxyphenyl)-4,6-bis(phenyl)-1,3,5-triazine, 2-(2-hydroxy-4-methoxyphenyl)-4,6-bis(phenyl)-1,3,5-triazine, 2,4-bis(2-hydroxy-4-methoxyphenyl)-6-ethyl mercaptan-1, 3,5-triazine, and 2,2'-[6-(4-methoxyphenyl)-1,3,5-triazine-2,4-diyl]bis{5-[(2-ethylhexyl)oxy]phenol}, or a combination thereof. The UV radiation absorber can be a benzotriazole radiation absorber, and is selected from 2-(2H-benzotdazol-2-yl)-4-(1,1,3,3-tetramethylbutyl)phenol, 2-(2H-benzotrazol-2-yl)-4,6-bis(1-methyl-1-phenylethyl) phenol, 2-(2H-benzotriazol-2-yl)-4,6-bis(1-methyl-1-phenylethyl)phenol, 2-tert-butyl-6-(5-chloro-2H-benzotriazol-2-yl)-4-methylphenol, 2-(2H-benzotiazol-2-yl)-4,6-di-tert-pentylphenol, 2-(2H-benzotriazol-2-yl)-4,6-di-tert-pentylphenol, 2,2'-methylenebis[6-(2H-benzotriazol-2-yl)-4-(1,1,3,3-tetramethylbutyl)phenol], 2-(2H-benzotriazol-2-yl)-6-dodecyl-4-methylphenol, or a combination thereof. In other examples, the UV radiation absorber can include a terephthalylidene dicamphor sulfonic acid radiation absorber or an avobenzone radiation absorber. The thermoplastic polyamide elastomeric particles can have a melting temperature form about 135° C. to about 210° C. and a weight average molecular weight from about 100,000 Mw to about 500,000 Mw. The three-dimensional printing kit can further include a coloring agent including a colorant to tint a transparent or translucent three-dimensional lens element during a build, a detailing agent including a detailing compound that reduces a temperature of the build material onto which the detailing agent is applied, or both.

A three-dimensional printing system of a lens element can include a fluid ejector loaded or loadable with a fusing agent to eject the fusing agent onto a powder bed of build material, and a UV energy source that emits electromagnetic radiation at an energy level from about 2 W/cm$^2$ to about 50 W/cm$^2$. The fusing agent can include a liquid vehicle and from about 0.5 wt % to about 20 wt % of a UV radiation absorber. The fusing agent can exhibit an absorbance from about 0.3 to about 2 at a radiation wavelength from about 340 nm to about 415 nm. The electromagnetic radiation that is emitted can include the radiation wavelength. In some examples, the UV radiation absorber can be selected from a triazine radiation absorber, a benzotriazole radiation absorber, a terephthalylidene dicamphor sulfonic acid radiation absorber, an avobenzone radiation absorber, or a combination thereof. In other examples, the build material can include from about 80 wt % to 100 wt % thermoplastic polyamide elastomeric particles having a D50 particle size from about 10 μm to about 150 μm.

A method for three-dimensional printing a lens element can include iteratively applying individual build material layers including from about 80 wt % to 100 wt % thermoplastic polyamide elastomeric particles having a D50 particle size from about 10 μm to about 150 μm to a powder bed, and based on a three-dimensional object model, iteratively and selectively dispensing a fusing agent onto the individual build material layers. The fusing agent can include a liquid vehicle and from about 0.5 wt % to about 20 wt % of a UV radiation absorber. Additionally, the fusing agent can exhibit an absorbance from about 0.3 to about 2 at a radiation wavelength from about 340 nm to about 415 nm. The method can also include iteratively exposing the powder bed to electromagnetic radiation that includes the radiation wavelength at an energy level from about 2 W/cm$^2$ to about 50 W/cm$^2$ for a time duration of about 0.1 second to about 10 seconds to selectively fuse the thermoplastic polyamide elastomeric particles in contact with the UV radiation absorber at the individual build material layers resulting in a transparent or translucent three-dimensional lens element. In some examples, the method can also include iteratively and selectively dispensing a coloring agent including a colorant onto one or multiple individual build material layers. The colorant that is dispensed can be present in the transparent or translucent fused three-dimensional lens element at from about 0.001 wt % to about 1.3 wt %. In one example, the method can include thermally reflowing the surface of the lens element at a depth from about 50 μm to about 1 mm and at a temperature at or above a glass transition temperature of the thermoplastic polyamide elastomer, thermally reflowing the surface of the lens element at a depth from about 50 μm to about 1 mm and at a temperature below a glass transition temperature of the thermoplastic polyamide elastomer in the presence of a finishing solvent that depresses the melting temperature of the thermoplastic polyamide elastomer, polishing the surface of the lens element, vapor phase treating the surface of the lens element, or a combination thereof.

A three-dimensionally printed lens element can include multiple fused composite layers in the shape of a lens element. The lens element can be transparent or translucent to light and can include from about 80 wt % to 99.9 wt % thermoplastic polyamide elastomer and from about 0.1 wt % to about 10 wt % UV radiation absorber carried by the thermoplastic polyamide elastomer. In some examples, the UV radiation absorber can be selected from a triazine radiation absorber, a benzotriazole radiation absorber, a terephthalylidene dicamphor sulfonic acid radiation absorber, an avobenzone radiation absorber, or a combination thereof. In other examples, the lens element can include from about 0.001 wt % to about 1.3 wt % colorant and can remain transparent or translucent. In some examples, the lens element can be a plano-convex lens, a double-convex lens, an aspheric lens, a plano-concave lens, a double-concave lens, a positive achromatic lens, a positive cylinder lens, a plano-convex axicons, a ball lens, a rod lens, cylinder lens, Powell lens, or Fresnel lens. The lens element can have a total transmission of visible light from about 10% to about 100%, for example. The lens element can include a surface that is finished by, for example, thermally reflowing the surface of the lens element at a depth from about 50 μm to about 1 mm and at a temperature at or above a glass transition temperature of the thermoplastic polyamide elastomer, thermally reflowing the surface of the lens element at a depth from about 50 μm to about 1 mm and at a temperature below a glass transition temperature of the thermoplastic polyamide elastomer in the presence of a finishing solvent that depresses the melting temperature of the thermoplastic polyamide elastomer, polishing the surface of the lens element, vapor phase treating the surface of the lens element, or a combination thereof.

It is noted that when discussing three-dimensional printing kits, three-dimensional printing systems, methods for three-dimensional printing, and/or three-dimensional printed lens elements, these discussions can be considered applicable to other examples, whether or not they are explicitly discussed in the context of that example. Thus, for example, in discussing a fusing agent in the three-dimensional printing kit, such disclosure is also relevant to and directly supported in context of the systems or methods of three-dimensional printing and/or the three-dimensional printed lens elements, or vice versa.

It is also understood that terms used herein will have the ordinary meaning in the relevant technical field unless specified otherwise. In some instances, there are terms defined more specifically throughout the specification or included at the end of the present specification, and thus, these terms have a meaning consistent with these more specific definitions.

Three-Dimensional Printing Kits for Printing Lens Elements

A three-dimensional printing kit 100 as shown in FIG. 1 for the manufacture of lenses can include a build material 150 including from about 80 wt % to 100 wt % thermoplastic polyamide elastomeric (TPA) particles 160 having a D50 particle size from about 10 μm to about 150 μm, and a fusing agent 110 including a liquid vehicle 130 and from about 0.5 wt % to about 20 wt % of a UV radiation absorber 120. By using a thermoplastic polyamide elastomeric particles in conjunction with a colorless or even lightly tinted UV radiation absorber, transparent or translucent lenses can be formed by the three-dimensional printing technology described herein. In further detail, color tinting can be beneficial for lens element operation related to a specific wavelength of light (or wavelength range of light). The coloration can be used, for example, as a light detector having a maximum sensitivity to light a specific wavelength or range of wavelengths. The term "UV radiation absorber" refers to radiation absorbers that absorb radiation within or very near the UV range, e.g., up to about 415 nm, sufficient generate heat for fusing thermoplastic polyamide elastomeric particles in accordance with the present disclosure. Typically the wavelength range can be from about 340 nm to about 415 nm or from about 340 nm to about 400 nm.

The thermoplastic polyamide elastomeric particles 160 can be used as the majority of the build material 150 because in many instances, when these particles are heat fused, even though as very small build material particles they may appear white due to a light scattering, the lens elements formed therefrom can be transparent or sufficiently translucent to allow for from about 10% to about 100% of total transmission of visible light. In other examples, the light transmission can be from about 20% to about 100%, from about 30% to about 100%, from about 40% to about 100%, from about 30% to about 90%, from about 60% to about 100%, from about 60% to about 95%, or from about 80% to about 100%, for example.

When referring to the "transmission" or "total transmission" of light through the lens element, this measurement is based on the percentage of total visible light applied that passes through the material of the lens element. The percentage of light that can pass through can be dependent on various factors, such as the thickness of the material, the tint of the material (if not colorless), the transparency translucency of the material, etc. As the present disclosure relates to lenses of various sizes, configurations, shapes, tints, translucency, etc., this measurement is taken at the locations of the lens element where light is intended to pass through the material. The transmission of light through the lens element is based on the total visible light applied to the lens element compared to the percentage of light therefrom that passes through the lens element. A broad spectrum of visible light can be used to measure the transmission of light.

The thermoplastic polyamide elastomeric particles 160 can have a melting temperature from about 135° C. to about 210° C., from about 140° C. to about 200° C., or from about 150° C. to about 190° C. In some examples, the weight average molecular weight of the thermoplastic polyamide elastomeric particles can be from about 100,000 Mw to about 500,000 Mw, from about 100,000 Mw to about 400,000 Mw, or from about 150,000 Mw to about 350,000 Mw, for example.

The thermoplastic polyamide elastomeric particles 160 can be present in the build material 150 at from about 80 wt % to 100 wt %, from about 90 wt % to 100 wt %, from about 95 wt % to about 100 wt %, or at about 100 wt %. Higher optical clarity in some examples may be achievable when using a higher content of the thermoplastic polyamide elastomer. If there are other particles present in addition to the thermoplastic polyamide elastomeric particles, they can be included at a concentration or weight ratio that does not interfere with the optical properties of the lens element once formed, or if it does slightly interfere, it does so within acceptable optical property tolerances. Alternatively, it may be that for certain optics, additional additives could be included to modify the optical properties of the lens, e.g., introduce light scattering.

If additives other than the thermoplastic polyamide elastomeric particles 160 are included in the build material 150, example additive particles for use can include filler, charging particles, flow aid particles, antioxidants, other polymer particles, etc. Charging particles, for example, may be added to suppress tribo-charging. Examples of suitable charging particles include aliphatic amines (which may be ethoxylated), aliphatic amides, quaternary ammonium salts (e.g., behentrimonium chloride or cocamidopropyl betaine), esters of phosphoric acid, polyethylene glycol esters, or polyols. Some suitable commercially available charging particles include HOSTASTAT® FA 38 (natural based ethoxylated alkylamine), HOSTASTAT® FE2 (fatty acid ester), and HOSTASTAT® HS 1 (alkane sulfonate), both from Clariant Int. Ltd. (North America). In other examples, if added, the charging particles can be included in an amount ranging from greater than 0 wt % to about 20 wt %, from about 0.1 wt % to about 10 wt %, or from about 0.2 to about 5 wt %, based upon the total wt % of the build material. Flow aid particles may be added to increase the coating flowability of the build material. Flow aid particles may be particularly desirable when the particles of the build material are on the smaller end of the particle size range. The flow aid particles can increase the flowability of the build material by reducing friction, lateral drag, and tribocharge buildup (by increasing the particle conductivity). Examples of suitable flow aid particles include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), or polydimethylsiloxane (E900). In some examples, if added, the flow aid particles can be included in an amount ranging from greater than 0 wt % to about 20 wt %, from about 0.1 wt % to about 10 wt %, or from about 0.2 to about 5 wt %, based upon the total wt % of the build material.

In further detail, the build material 150 can thus be selectively heat fused upon contact with the fusing agent 110 and exposure to electromagnetic radiation having a wavelength suitable for generating heat where the fusing agent has been applied to the build material. In some examples, thermoplastic polyamide elastomeric particles 160 can have a melting point within a reasonably large range, depending on the structure of the thermoplastic polyamide elastomer. An example melting temperature for TPA may be from about 135° C. to about 210° C.

The build material 150 can have a D50 particle size that can range from about 10 μm to about 150 μm. In other examples, the thermoplastic polyamide elastomeric particles 160 can have a D50 particle size that can range from about 10 μm to about 100 μm, from about 20 μm to about 80 μm, from about 30 μm to about 50 μm, from about 25 μm to about 75 μm, from about 40 μm to about 80 μm, from about 50 μm to about 75 μm, from about 75 μm to about 150 μm, from about 60 μm to about 90 μm, or from about 100 μm to about 150 μm, for example. The terms "size" or "particle size," as used herein, refer to the diameter of a substantially spherical particle, or the effective diameter of a non-spherical particle, e.g., the diameter of a sphere with the same mass and density as the non-spherical particle as determined by weight. Particle size information can be determined and/or verified using a scanning electron microscope (SEM), or can be measured using a particle analyzer such as a MASTER-SIZER™ 3000 available from Malvern Panalytical, for example. The particle analyzer can measure particle size using laser diffraction. A laser beam can pass through a sample of particles and the angular variation in intensity of light scattered by the particles can be measured. Larger particles scatter light at smaller angles, while smaller particles scatter light at larger angles. The particle analyzer can then analyze the angular scattering data to calculate the size of the particles using the Mie theory of light scattering. Particle size can be reported as a volume equivalent sphere diameter. In some examples, an average particle size can refer to a mathematical average of the particle sizes, which is normally about the D50 particle size, but can be different depending on the particle size distribution.

That being stated, an example Gaussian-like distribution of the particles can be characterized generally using "D10," "D50," and "D90" particle size distribution values, where D10 refers to the particle size at the $10^{th}$ percentile, D50 refers to the particle size at the $50^{th}$ percentile, and D90 refers to the particle size at the $90^{th}$ percentile. For example, a D50 value of about 25 μm means that about 50% of the particles (by number) have a particle size greater than about 25 μm and about 50% of the particles have a particle size less than about 25 μm. Particle size distribution values are not necessarily related to Gaussian distribution curves. In practice, true Gaussian distributions are not typically present, as some skewing can be present, but still, the Gaussian-like distribution can be considered to be "Gaussian" as used in practice. Particle size distribution can be expressed in terms of D50 particle size, which can approximate average particle size, but may not be the same.

A shape of the particles of the build material 150 can be spherical, irregular spherical, rounded, semi-rounded, discoidal, angular, subangular, cubic, cylindrical, or any combination thereof. In some examples, the particles can include spherical particles, irregular spherical particles, or rounded particles. In some examples, the shape of the particles can be uniform or substantially uniform, which can allow for relatively uniform melting of the particles.

The build material 150 can be fused together when the temperature increases to or above the melting or softening temperature of the thermoplastic polyamide elastomeric particles 160, but fusion can also occur in some instances below the melting point. As used herein, "melting point" refers to a temperature at which a polymer transitions from a crystalline phase to a pliable, amorphous phase. When contacted with the fusing agents described herein, the thermoplastic polyamide elastomeric particles in contact with the UV radiation absorber can coalesce to form a layer of a three-dimensional part while the remaining thermoplastic polyamide elastomeric particles can remain loose.

Regarding the fusing agents 110, the fusing compound used in the fusing agent includes a UV radiation absorber 120, which can be included at a concentration from about 0.5 wt % to about 20 wt %, from about 0.5 wt % to about 10 wt %, from about 0.5 wt % to about 8 wt %, from about 0.5 wt % to about 5 wt %, from about 1 wt % to about 10 wt %, or from about 2 wt % to about 20 wt %, for example. The other components in the fusing agent can include liquid vehicle components, such as water and/or organic cosolvent. There may also be other components, such as surfactant, as described in greater detail below.

Colorless or even lightly tinted UV radiation absorbers that are finely dispersed or solubilized in a liquid vehicle that has stronger absorbance in the UV-range (compared to the visible range), e.g., absorbance from about 0.3 to about 2 at a wavelength from about 340 nm to about 415 nm, can be used to form transparent or translucent lens elements using the three-dimensional printing technology described herein. Example radiation absorbers that can be used include triazine radiation absorbers, e.g., bemotrizinol, benzotriazole radiation absorbers, e.g., octrizole, terephthalylidene dicamphor sulfonic acid (ecamsule) radiation absorber, and/or avobenzone radiation absorbers. Most of these compounds can be solubilized in the liquid vehicle. In some instances, such as is the case with avobenzone radiation absorbers, these compounds can be finely dispersed in the liquid vehicle, e.g., D50 particle size from about 30 nm to about 1000 nm, from about 50 nm to about 250 nm, from about 50 nm to about 150 nm, from about 50 nm to about 100 nm, from about 100 nm to about 1000 nm, or from about 100 nm to about 500 nm can be formed by milling avobenzone in an aqueous dispersion vehicle (water and propylene glycol, dispersant, etc). When the avobenzone particles are formed (or other type of particles are formed that are not soluble in the liquid vehicle), they can be formulated in a fusing agent. Regardless of whether the fusing agent 110 includes solubilized or dispersed UV radiation absorber, the combination of these fusing agents with thermoplastic polyamide elastomeric particles for the printing lens elements can provide lenses that can range from transparent to translucent, having a visible light transmission from about 10% to about 100%, from about 20% to about 100%, from about 30% to about 100%, from about 30% to about 100%, from about 40% to about 100%, from about 30% to about 90%, from about 60% to about 100%, from about 60% to about 95%, or from about 80% to about 100%, for example. The lens elements can be used for imagery, sensing applications, or other applications where the bending of light may be beneficial.

As mentioned, the fusing agent 110 can exhibit an absorbance from about 0.3 to about 2 at a wavelength from about 340 nm to about 415 nm. Alternatively, the absorbance can be from about 0.5 to about 1.5, from about 0.3 to about 1, etc. Alternatively, the wavelength where one or more of these absorbances may occur can be from about 340 nm to about 400 nm, from about 350 nm to about 390 nm, or from about 360 nm to about 385 nm. The peak absorbance for the UV fusing agent may or may not be within these wavelength ranges. For example, if the peak absorbance for these fusing agents is outside of these wavelength ranges, the absorbance within these ranges may still be sufficient, e.g., absorbance ranging from about 0.3 to about 2, from about 0.5 to about 1.5, from about 0.3 to about 1, or from about 0.3 to about 0.8, to enhance the temperature of a build material 150 sufficient to fuse the build material to form the three dimensional object. For clarity and by way of example, when referring to an absorbance from about 0.3 to about 0.8 at a wavelength from about 340 nm to about 400 nm, what is meant is that from about 16% and 50% of incoming radiation at a wavelength within the spectral range 340 nm to 400 nm is absorbed. The emission within this wavelength range can include the peak emission in some examples, but in other examples, the peak emission of electromagnetic radiation may be outside of these ranges, but there is enough shoulder within these ranges to promote build material fusion. Thus, exposure to appropriate energy levels and wavelengths of electromagnetic radiation causes the UV radiation absorber to become heated, providing a sufficient temperature boost to cause the thermoplastic polyamide elastomeric particles of the build material to become heat melted or fused. For example, by application of electromagnetic radiation within one of these ranges at an energy level from about 2 W/cm$^2$ to about 50 W/cm$^2$ with an irradiation application time (or dwell time) from of about 0.05 second to about 10 seconds, the thermoplastic polyamide elastomeric particles of the build material can be sufficiently heated to cause intra-layer heat fusion as well as inter-layer fusion (from layer to layer), such as by the melting together of particles and layers.

As used herein, "absorbance" indicates the capacity of the UV radiation absorbers to absorb light, and can be measured using a UV-visible spectrophotometer such as a Cary 5000 spectrometer, for example. This range can depend on the UV radiation absorber (or absorber) concentration in the fusing agent. To illustrate, at a concentration of about 0.5 wt % to about 20 wt % UV radiation absorber in the fusing agent, a 0.3 and 0.8 absorbance represents an absorbance range that can be reasonably achieved based on about 40% reflected energy to about 12% reflected energy, resulting in enough heat to heat-fused thermoplastic polyamide elastomeric particles of the build material.

As used herein, "peak absorption" indicates that from about 15% to about 100% of light emitted at a specified wavelength range is absorbed by the UV radiation absorber. In other examples, at least about 50%, at least about 70%, at least about 80%, at least about 90%, at least about 95%, or 100% of the light emitted at the wavelengths emitted by an energy source can be absorbed by the UV radiation absorber. The UV radiation absorber can exhibit absorption at other wavelengths outside of this range, but the UV radiation absorber will exhibit strong absorption (and in some instances an absorption peak) from about 50% to 100% absorption within the range of about 340 nm to about 415 nm, and the absorption is sufficient to cause the thermoplastic polyamide elastomeric particles of the build material to become intra-layer and inter-layer heat-fused to form a multi-layered three-dimensional object. In further detail, when fusing the build material, a certain minimum amount of radiation (J/cm$^2$/sec) can be used to cause fusing. Whether that amount comes from 20% or 80% or 100% of the incoming radiation that is absorbed (e.g., such as from inherent material absorption subtracting reflection, etc.), as long as there is enough radiation used, fusing can occur. The term "fuse" or "fusing" when referring to the build material indicates that thermoplastic polyamide elastomeric particles are fully or partially melted together so that that they become joined, and thus upon cooling, the three-dimensional printed objects formed are in the form of a monolithic mass polymer (whether the particles were fully melted or partially melted and joined at their surfaces). Furthermore, as UV radiation absorber is used as the fusing compound in the fusing agent, the UV radiation absorber is dispersed within the monolithic mass of the three-dimensional printed object in accordance with examples of the present disclosure. The term "fusing agent" should not be confused with a description of "fusing" of the thermoplastic polyamide elastomeric particles. For example, the fusing agent 110 containing UV radiation absorber is used to absorb electromagnetic energy and convert that energy to heat so that at locations where it is applied to layers of the build material, the thermoplastic polyamide elastomeric particles can become fused, e.g., melted, together.

Example UV-absorbing fusing agents may include triazine radiation absorbers, such as 2,4-bis(2,4-dimethylphenyl)-6-(2-hydroxy-4-octyloxyphenyl)-1,3,5-triazine, 2,4-bis(2,4-dimethylphenyl)-6-(2-hydroxy-4-isooctyloxyphenyl)-1,3,5-triazine, 2,4-bis(2,4-dimethyl phenyl)-6-(2-hydroxy-4-methoxy phenyl)1,3,5-triazine, 2-(2-hydroxy-4-hexyloxyphenyl)-4,6-bis(phenyl)-1,3,5-triazine, 2-(2-hydroxy-4-methoxyphenyl)-4,6-bis(phenyl)-1,3,5-triazine, 2,4-bis(2-hydroxy-4-methoxyphenyl)-6-ethyl mercaptan-1, 3,5-triazine, and 2,2'-[6-(4-methoxyphenyl)-1,3,5-triazine-2,4-diyl]bis{5-[(2-ethylhexyl)oxy]phenol}, or a combination thereof. The UV radiation absorber can be a benzotriazole radiation absorber, and is selected from 2-(2H-benzotriazol-2-yl)-4-(1,1,3,3-tetramethylbutyl)phenol, 2-(2H-benzotiazol-2-yl)-4,6-bis(1-methyl-1-phenylethyl) phenol, 2-(2H-benzotriazol-2-yl)-4,6-bis(1-methyl-1-phenylethyl)phenol, 2-tert-butyl-6-(5-chloro-2H-benzotriazol-2-yl)-4-methylphenol, 2-(2H-benzotriazol-2-yl)-4,6-di-tert-pentylphenol, 2-(2H-benzotriazol-2-yl)-4,6-di-tert-pentylphenol, 2,2'-methylenebis[6-(2H-benzotrazol-2-yl)-4-(1,1,3,3-tetramethylbutyl)phenol], 2-(2H-benzotriazol-2-yl)-6-dodecyl-4-methylphenol, or a combination thereof. In other examples, the UV radiation absorber can include a terephthalylidene dicamphor sulfonic acid radiation absorber or an avobenzone radiation absorber.

Regarding the liquid vehicle 130, the fusing agent 110 may include from about 10 wt % to about 85 wt % water and from about 10 wt % to about 90 wt % organic cosolvent, based on a total weight of the fusing agent. The organic cosolvent can be selected from any of a number of compounds, such as aliphatic alcohols and/or polyols, e.g., glycerol, propylene glycol, C2-C10 aliphatic alcohols, oligoglycol, etc., lactams, ethers, esters, e.g., octyl acetate. More specific examples of organic cosolvents that can be used include, without limitation, propylene glycol; glycerol; 1,2 butanediol; 1,2-propanediol; 2,3-butanediol; 1,2-pentanediol; 2-methyl-2,4-pentanediol; 2-methyl-1,3-propanediol; triols; tetrahydrofuran; ethylene glycol dimethyl ether ethylene glycol diethylene glycol; triethylene glycol; tripropylene glycol butyl ether; 2-pyrrolidone; 1-(2-hydroxyl)-2-pyrrolidone; or a combination thereof.

The liquid vehicle can further include from about 0.1 wt % to about 20 wt % of other liquid components based on a total weight of the fusing agent, such as surfactant, dispersant, additive that inhibits growth of harmful microorganisms, pH adjuster, buffer, viscosity modifier, sequestering compound, preservative, etc. For example, there may be from about 0.01 wt % to about 10 wt % surfactant, and from about 0.01 wt % to about 10 wt % dispersant, from about 0.01 wt % to about 4 wt % chelating compound and/or other additives, or a combination thereof.

If surfactant is included, the surfactant can include a non-ionic surfactant, a cationic surfactant, and/or an anionic surfactant. Example non-ionic surfactants can include self-emulsifiable, nonionic wetting agents based on acetylenic diol chemistry (e.g., SURFYNOL® SEF from Air Products and Chemicals, Inc., USA), a fluorosurfactant (e.g., CAPSTONE fluorosurfactants from DuPont, USA), or a combination thereof. In other examples, the surfactant can be an ethoxylated low-foam wetting agent (e.g., SURFYNOL® 440, SURFYNOL® 465, or SURFYNOL® CT-111 from Air Products and Chemical Inc., USA), or an ethoxylated wetting agent and molecular defoamer (e.g., SURFYNOL® 420 from Air Products and Chemical Inc., USA). Still other examples of surfactants can include wetting agents and molecular defoamers (e.g., SURFYNOL® 104E from Air Products and Chemical Inc., USA), alkylphenylethoxylates, solvent-free surfactant blends (e.g., SURFYNOL® CT-211 from Air Products and Chemicals, Inc., USA), water-soluble surfactant (e.g., TERGITOL® TMN-6, TERGITOL® 15S7, and TERGITOL® 15S9 from The Dow Chemical Company. USA), or a combination thereof. In other examples, the surfactant can include a non-ionic organic surfactant (e.g., TEGO® Wet 510 from Evonik Industries AG, Germany), a non-ionic secondary alcohol ethoxylate (e.g., TERGITOL® 15-S-5, TERGITOL® 15-S-7, TERGITOL® 15-S-9, and TERGITOL® 15-S-30 all from Dow Chemical Company, USA), or a combination thereof. Example anionic surfactants can include alkyldiphenyloxide disulfonate (e.g., DOWFAX® 8390 and DOWFAX® 2A1 from The Dow Chemical Company, USA), oleth-3 phosphate surfactant (e.g., CRODAFOS™ N3 Acid from Croda, UK), and dioctyl sulfosuccinate sodium salt. Example cationic surfactants can include dodecyltrimethylammonium chloride, hexadecyldimethylammonium chloride, or a combination thereof. In some examples, the surfactant can include a co-polymerizable surfactant. Co-polymerizable surfactants can include polyoxyethylene alkylphenyl ether ammonium sulfate, sodium polyoxyethylene alkylether sulfuric ester, polyoxyethylene styrenated phenyl ether ammonium sulfate, or mixtures thereof. Other surfactants that may be used include Span and Triton surfactants. In some more specific examples, the surfactant can be a polyethylene sorbitol ester, e.g., Polysorbate 80 or Tween 80, a polyoxyethylene lauryl ether, e.g., BRIJ® 23 from Sigma-Aldrich, or a mixture thereof. In this example, the surfactant may be included at from about 0.4 wt % to about 4 wt %. In some examples, however, the total surfactant content in the fusing agent 110 (which may include a blend of multiple surfactants) may be from about 0.01 wt % to about 5 wt %, from about 0.05 wt % to about 2 wt %, or from about 0.01 wt % to about 1 wt %, or from about 0.4% to about 4 wt %.

Some example additives that can inhibit the growth of harmful microorganisms can include biocides, fungicides, and other microbial agents. Example antimicrobial agents can include the NUOSEPT® (Ashland Inc., USA), VANCIDE® (R. T. Vanderbilt Co., USA), ACTICIDE® B20 and ACTICIDE® M20 (Thor Chemicals, U.K.), PROXEL® GXL (Arch Chemicals, Inc., USA), BARDAC® 2250, 2280, BARQUAT® 50-65B, and CARBOQUAT® 250-T, (Lonza Ltd. Corp., Switzerland), KORDEK® MLX (The Dow Chemical Co., USA), and a combination thereof. In other examples, if included, a total amount of antimicrobial agents in the fusing agent 110 can range from 0.01 wt % to 3 wt %.

In some examples, a liquid vehicle may further include a pH adjuster or buffer. The pH adjuster can be any compound that raises or lowers the pH when added in relatively small amounts, e.g., 0.01 wt % to about 1 wt %. The buffer, if used, can be provided to withstand small changes (e.g., less than 1) in pH when small quantities of a water-soluble acid or a water-soluble base are added to a composition containing the buffer. The buffer can have a pH that can range from 5 to 9.5, from 7 to 9, or from 7.5 to 8.5. In some examples, the buffer can include a poly-hydroxy functional amine. In other examples, the buffer can include potassium hydroxide, 2-[4-(2-hydroxyethyl) piperazin-1-yl] ethane sulfonic acid, 2-amino-2-(hydroxymethyl)-1,3-propanediol (TRIZMA® sold by Sigma-Aldrich, USA), 3-morpholinopropanesulfonic acid, triethanolamine, 2-[bis-(2-hydroxyethyl)-amino]-2-hydroxymethyl propane-1,3-diol (bis tris methane), N-methyl-D-glucamine, N,N,N'N'-tetrakis-(2-hydroxyethyl)-ethylenediamine and N,N,N'N'-tetrakis-(2-hydroxypropyl)-ethylenediamine, beta-alanine, betaine, or mixtures thereof. In yet other examples, the buffer can include 2-amino-2-(hydroxymethyl)-1,3-propanediol (TRIZMA® sold by Sigma-Aldrich, USA), beta-alanine, betaine, or mixtures thereof.

In some more specific examples, the fusing agent 110 can include from about 0.5 wt % to about 6 wt % UV radiation absorber 120; from about 40 wt % to about 90 wt % organic cosolvent; from about 0.4 wt % to about 4 wt % of a surfactant selected from a polyethylene sorbitol ester, a polyoxyethylene lauryl ether, or a mixture thereof; and water. The polyethylene sorbitol ester can be present in one example in the form of polyoxyethylene-sorbitan-20 monooleate, e.g., polysorbate 80 or TWEEN 80 from Sigma-Aldrich. The polyoxyehtylene lauryl ether can be present in another example in the form of polyoxyethylene (23) lauryl ether, e.g., BRIJ® 23 from Sigma-Aldrich. In some examples, the fusing agent can exhibit an absorbance from about 0.3 to about 2 at a wavelength from about 340 nm to about 400 nm.

The three-dimensional printing kits can further include additional fluids or agents, such as coloring agents to impart color or tint to the lens elements, detailing agents to provide more detailed printing at the border of the three-dimensional printed object, or the like. A coloring agent, if present, can include a liquid vehicle similar to that used in the fusing agent 110 and a colorant, such as a pigment and/or a dye. As the lens elements of the present disclosure are transparent or translucent after fusion, a coloring agent can be used with good success in providing color or tint, provided it does not reduce the total visible light transmission below about 10%. Color tinting may be beneficial for lens element operation related to a specific wavelength of light (or wavelength range of light).

When adding colorant to tint a lens element using a coloring agent, example coloring agent loading concentrations can range from about 0.1 wt % colorant to about 10 wt % colorant, and the coloring agent can be applied on a layer-by-layer basis so that in the final lens element, the colorant can be present at from about 0.001 wt % to about 1.3 wt %, from about 0.001 wt % to about 1 wt %, from about 0.01 wt % to about 1 wt %, or from about 0.01 wt % to about 0.5 wt %, thin The amount of colorant included in the lens element can depend on how much tinting is desired, the colorant used, whether colorants are combined to generate secondary or other colors (other than cyan, magenta, or yellow), the level of transmission the lens element has without colorant included, whether a dye or pigment is used as the colorant, etc. For example, a cyan coloring agent can be applied at a contone level to leave cyan colorant within a layer or multiple layers of the lens element at from about 0.001 wt % to about 0.3 wt %, whereas a magenta coloring agent may applied at a contone level to leave magenta colorant within a layer or multiple layers of the lens element at from about 0.01 wt % to about 1 wt %. Yellow may be applied more liberally in some instances, such as at from about 0.1 wt % to 1.3 wt %, for example. Again, combining colors can also occur provided the tinting does not cause the lens element to exhibit transmission within the visible range of less than about 10%. These ranges are examples only and should not be considered limiting.

The detailing agent, on the other hand, can include a detailing compound. The detailing compound can reduce a temperature of the build material onto which the detailing agent is applied. In some examples, the detailing agent can be printed around the edges of the portion of the powder that is printed with the fusing agent. The detailing agent can increase selectivity between the fused and unfused portions of the powder bed by reducing the temperature of the powder around the edges of the portion to be fused.

The detailing compound can be water and/or an organic cosolvent that can evaporate at the temperature of the powder bed. In some cases the powder bed can be preheated to a preheat temperature within about 10° C. to about 70° C. of the fusing temperature of the thermoplastic polyamide elastomeric particles. Depending on the type of thermoplastic polyamide elastomeric particles used, the preheat temperature can be in the range of about 90° C. to about 200° C. or higher. The detailing compound can be a solvent that can evaporate when it comes into contact with the powder bed at the preheat temperature, thereby cooling the printed portion of the powder bed through evaporative cooling.

In certain examples, the detailing agent can include water, cosolvents, or a combination thereof. In some examples, the detailing agent can be mostly water. For example, the detailing agent can be from about 85 wt % to 100 wt %, or from about 85 wt % to about 99 wt % water. In further examples, the detailing agent can be from about 95 wt % to 100 wt %, or from about 95 wt % to 99 wt % water.

In some examples, the detailing agent can include a cosolvent. The cosolvent can be as identified above. In other examples, cosolvents for use in the detailing agent can include xylene, methyl isobutyl ketone, 3-methoxy-3-methyl-1-butyl acetate, ethyl acetate, butyl acetate, propylene glycol monomethyl ether, ethylene glycol mono tert-butyl ether, dipropylene glycol methyl ether, diethylene glycol butyl ether, ethylene glycol monobutyl ether, 3-Methoxy-3-Methyl-1-butanol, isobutyl alcohol, 1,4-butanediol, N,N-dimethyl acetamide, or a combination thereof. The cosolvent may be present in the detailing agent at from about 1 wt % to about 15 wt %, at from about 5 wt % to about 10 wt %, at from about 1 to about 10 wt %, or from about 5 wt % to about 15 wt %.

In still further examples, the detailing agent can be substantially devoid of UV radiation absorber or other radiation absorbers. That is, in some examples, the detailing agent can be substantially devoid of ingredients that absorb enough radiation energy to cause particles of the build material to fuse or adhere to one another. In some examples, the detailing agent can include colorants such as dyes or pigments, but in small enough amounts that the colorants do not cause the powder printed with the detailing agent to fuse when exposed to the radiation energy.

The detailing agent can also include ingredients to allow the detailing agent to be jetted by a fluid jet printhead, e.g., piezo- or thermal-printhead. In some examples, the detailing agent can include jettability imparting ingredients such as those in the fusing agent 110 described above. These ingredients can include a liquid vehicle, surfactant, dispersant, cosolvent, biocides, viscosity modifiers, materials for pH adjustment, sequestering agents, preservatives, and so on. These ingredients can be included in any of the amounts described above.

The fusing agent 110 and the build material 150 can be used together to form three-dimensional objects, such as the lenses of the present disclosure. For example, the fusing agent can be applied to the build material on a layer-by-layer basis and can move into vacant spaces between particles of the build material. The fusing agent can provide binding between thermoplastic polyamide elastomeric particles after printing of the fusing agent and exposure to electromagnetic energy within the absorption spectrum of the UV radiation absorber 120. The UV radiation absorber can provide a boosting capacity sufficient to increase the temperature of the build material above the melting or softening point of the thermoplastic polyamide elastomeric particles therein. As used herein, "temperature boosting capacity" refers to the ability of UV radiation absorber as a fusing compound to convert electromagnetic radiation, e.g., from about 340 nm to about 415 nm, such as ultraviolet radiation, e.g., from about 340 nm to about 400 nm, into thermal energy to increase the temperature of the thermoplastic polyamide elastomeric particles of the build material over and above the temperature of the unprinted portion of the build material.

Three-Dimensional Printing Systems for Printing Lens Elements

Figure 2:
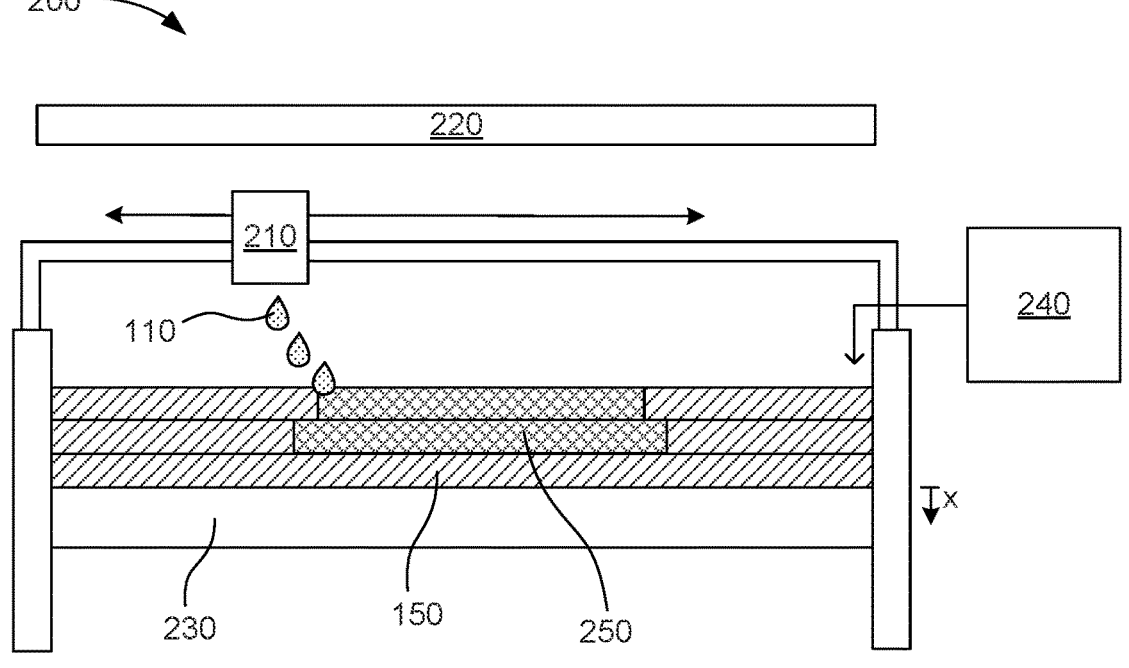
FIG. 2 schematically illustrates example three-dimensional printing systems in accordance with the present disclosure.

Example three-dimensional printing systems 200 are shown in FIG. 2, which includes fusing agent 110 and a build material 150 as previously described in FIG. 1. In addition, the system can include a fluid applicator 210 and an electromagnetic energy source 220 to apply fusing agent and to irradiate the powder bed with electromagnetic radiation. Again, the build material can include from about 80 wt % to 100 wt % thermoplastic polyamide elastomeric particles having a D50 particle size from about 10 µm to about 150 µm, and the fusing agent can include a liquid vehicle and a UV radiation absorber carried by the liquid vehicle. The build material and the fusing agent can be as described with respect to the three-dimensional printing kits. The fluid applicator can be fluidly coupled to or fluidly coupleable to the fusing agent to selectively and iteratively eject the fusing agent onto successively placed individual layers of the build material. The electromagnetic energy source can be positioned to expose the individual layers of the build material to radiation energy to selectively fuse the thermoplastic polyamide elastomeric particles in contact with the UV radiation absorber to iteratively form a three-dimensional lens element, shown in part at 250. The three-dimensional printing system can also further include other fluids in some examples, such as a coloring agent and/or a detailing agent (not shown).

The fluid applicator 210 can be any type of apparatus capable of selectively dispensing or applying a fluid agent. For example, the fluid applicator can be a fluid ejector or digital fluid ejector, such as an inkjet print head, e.g., a piezoelectric print head, a thermal print head, a continuous print head, etc. The fluid applicator could likewise be a sprayer, a dropper, a coating device, or other similar structure for applying a fluid agent to the polymeric build material. Thus, in some examples, the application can be by jetting or ejecting from a digital fluid jet applicator.

In some examples, the fluid applicator can be located on a carriage track, but could be supported by any of a number of structures. The electromagnetic energy source 220 can likewise be carried by the carriage, though in this example, the electromagnetic energy source is at a fixed location above the powder bed of build material 150. In other examples, the fluid applicator (and in some instances the electromagnetic energy source) can be operable to move back and forth to provide both x-axis and y-axis movement over the polymeric build material when positioned over or adjacent to a polymeric build material on a powder bed.

In some examples, as further illustrated in FIG. 2, the three-dimensional printing system 200 can include a build platform 230 to support a powder bed of build material. The build platform can be positioned to receive the fusing agent from the fluid applicator onto the build material. The build platform can be configured to drop in height (shown at "x"), thus allowing for successive layers of build material to be applied by a spreader 240. The build material can be layered in the build platform at a thickness that can range from about 5 µm to about 1 cm. In some examples, individual layers can have a relatively uniform thickness. In some examples, a thickness of a layer of the particulate build material can range from about 10 µm to about 500 µm, from about 50 µm to about 500 µm, from about 80 µm to about 400 µm, from about 100 µm to about 350 µm, or from about 100 µm to about 300 µm.

The electromagnetic energy source can be any energy source operable to emit ultraviolet energy having a wavelength that can range from about 340 nm to about 415 nm at a sufficient energy level within one or both of these ranges to generate selective heating sufficient to heat fuse the thermoplastic polyamide elastomeric particles of the build material 150 in contact with the fusing agent 110. These ranges may include strong absorption wavelengths within these ranges, but may or may not include the peak wavelength. For example, the peak wavelength may be adjacent to this range, but still provides a shoulder emission with enough electromagnetic radiation to cause the UV radiation absorber to generate heat sufficient to fuse the thermoplastic polyamide elastomeric particles together. The electromagnetic energy source can be, for example, a UV LED array, fluorescent lamp emitting UV, mercury vapor lamp, high energy gas discharge lamp, UV emitting laser or laser array. In some examples, the electromagnetic energy source can be a UV LED array.

In some examples, when applied to a layer of the build material 150, the fusing agent 110 can be capable of wetting the build material through most of or all of the layer of build material, and the UV radiation absorber can penetrate into microscopic pores of the build material layer (e.g. the spaces between the thermoplastic polyamide elastomeric particles of the build material). The UV radiation absorber can be activated by heating using exposure to electromagnetic radiation, including UV electromagnetic radiation in some instances. When activated, the fusing agent can form a continuous network of polymer, melting the thermoplastic polyamide elastomeric particles of the build material together to form a three-dimensional object or a printed layer of the three-dimensional object.

Three-Dimensional Printing Methods

A method for three-dimensional printing lens elements is illustrated schematically at 300 in FIG. 3, and includes iteratively applying 310 individual build material layers including from about 80 wt % to 100 wt % thermoplastic polyamide elastomeric particles having a D50 particle size from about 10 µm to about 150 µm to a powder bed, and based on a three-dimensional object model, iteratively and selectively dispensing 320 a fusing agent onto the individual build material layers. The fusing agent can include a liquid vehicle and from about 0.5 wt % to about 20 wt % of a UV radiation absorber. Additionally, the fusing agent can exhibit an absorbance from about 0.3 to about 2 at a radiation wavelength from about 340 nm to about 415 nm. The method can also include iteratively exposing 330 the powder bed to electromagnetic radiation that includes the radiation wavelength at an energy level from about 2 W/cm$^2$ to about 50 W/cm$^2$ for a time duration of about 0.1 second to about 10 seconds to selectively fuse the thermoplastic polyamide elastomeric particles in contact with the UV radiation absorber at the individual build material layers resulting in a transparent or translucent three-dimensional lens element. In some examples, the method can also include iteratively and selectively dispensing a coloring agent including a colorant onto one or multiple individual build material layers. The colorant that is dispensed can be present in the transparent or translucent fused three-dimensional lens element at from about 0.001 wt % to about 1.3 wt %. In one example, the method can include thermally reflowing the surface of the lens element at a depth from about 50 μm to about 1 mm and at a temperature at or above a glass transition temperature of the thermoplastic polyamide elastomer, thermally reflowing the surface of the lens element at a depth from about 50 μm to about 1 mm and at a temperature below a glass transition temperature of the thermoplastic polyamide elastomer in the presence of a finishing solvent that depresses the melting temperature of the thermoplastic polyamide elastomer, polishing the surface of the lens element, vapor phase treating the surface of the lens element, or a combination thereof. The disclosure herein related to the three-dimensional printing kits and systems, as well as the three-dimensional printed lens elements described hereinafter, provide additional details related to these methods.

Three-Dimensionally Printed Lens Elements

Figure 4:
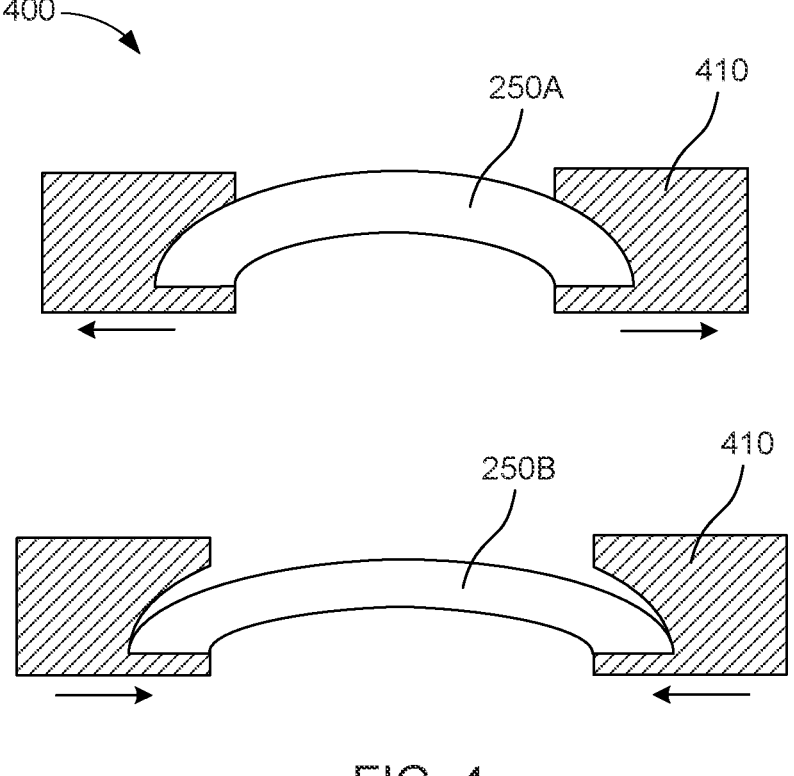
FIG. 4 schematically illustrates a three-dimensionally printed lens element that is mechanically actuatable in accordance with the present disclosure.

A three-dimensionally printed lens element 250A, 250B is shown in FIG. 4. In this example, the lens element is shown as being mechanically deformable, with a first configuration shown at 250A and a second configuration shown at 250B. In this example, a mechanical actuator 410 is shown as introducing mechanical stress or strain on the lens element, e.g., to stretch and/or compress, to change the optics of the lens element. In some examples, the lens element can have a Young's (elastic) modulus from about 250 MPa to about 2500 MPa, from about 500 MPa to about 2000 MPa, or from about 1000 MPa to about 1500 MPa, for example. The use of thermoplastic polyamide elastomeric particles in forming the lens element can provide a good material for lens element deformation due to its pliable nature and amorphous structure after heat fusion.

The three-dimensionally printed lens element can include multiple fused composite layers in the shape of a lens element. The lens element can be transparent or translucent to light and can include from about 80 wt % to about 99.9 wt % thermoplastic polyamide elastomeric particles and from about 0.1 wt % to about 10 wt % UV radiation absorber carried by the thermoplastic polyamide elastomer. In some examples, the UV radiation absorber can be selected from a triazine radiation absorber, a benzotriazole radiation absorber, a terephthalylidene dicamphor sulfonic acid radiation absorber, an avobenzone radiation absorber, or a combination thereof. In other examples, the lens element can include from about 0.001 wt %/o to about 1.3 wt % colorant and can remain transparent or translucent. Color tinting may be beneficial for lens element operation related to a specific wavelength of light (or wavelength range of light), e.g., use as a light detector having a maximum sensitivity to light a specific wavelength or range of wavelengths. In some examples, the lens element can be a piano-convex lens, a double-convex lens, an aspheric lens, a plano-concave lens, a double-concave lens, a positive achromatic lens, a positive cylinder lens, a piano-convex axicons, a ball lens, a rod lens, a cylinder lens, a Powell lens, or a Fresnel lens. The lens element can have a total transmission of visible light from about 10% to 100%, for example. The size of the lenses formed may range, for example, from about 1 mm to a few meters in diameter or length based on the longest dimension of the lens. The lens elements can be used for imagery, sensing applications, or other applications where the bending of light may be beneficial. For example, if the lens element is to be used for imaging, e.g., camera, microscope, binoculars, etc., then a range from about 30% to about 100% transmission may be more suitable.

The surface area of the lens produced using the kits, systems, and methods described herein can result in some instances with unfused build material particles that become stuck on the surface of the lens element, and there may also be some inherent roughness as well, both of which can scatter light. In examples where light scattering may be problematic, the surface can be smoothed by a surface treatment. In some examples, surface treatment can occur by thermally reflowing the surface of the lens element at a depth from about 50 μm to about 1 mm and at a temperature at or above a glass transition temperature of the thermoplastic polyamide elastomer, thermally reflowing the surface of the lens element at a depth from about 50 μm to about 1 mm and at a temperature below a glass transition temperature of the thermoplastic polyamide elastomer in the presence of a finishing solvent that depresses the melting temperature of the thermoplastic polyamide elastomer, mechanical polishing, chemical polishing, the surface of the lens element, vapor phase treating the surface of the lens element, or a combination thereof. For example, thermally reflowing the thermoplastic polyamide elastomer of the lens element can be carried out by applying hot forced air, e.g., from a heat gun, directed to the surface of the lens element where smoothness may be desired.

Definitions

It is noted that, as used in this specification and the appended claims, the singular forms "a," "an," and "the" include plural referents unless the context clearly dictates otherwise.

As used herein, "liquid vehicle" refers to liquid components, such as water, organic cosolvent, and/or other fluids that can be included to carry the dispersed and/or solubilized UV radiation absorber, and in some examples, can include surfactants, solvents, cosolvents, anti-kogation agents, buffers, biocides, sequestering agents, viscosity modifiers, surface-active agents, and/or the like.

As used herein, "applying" refers to the dispensing of a material for three-dimensional printing, such as spreading of build material to a powder bed, or dispensing a fluid onto the powder. In the case of a fluid agent, dispensing can be by ejecting, jetting, dropping, spraying, etc. The terms "ejecting" or "jetting" more specifically refer to compositions that are ejectable from fluidjet architecture, such as from thermal or piezo pens with printing orifices or openings suitable for ejection of small droplets of fluid. In a few examples, the fluid droplet size can be less than 10 picoliters, less than 20 picoliters, less than 30 picoliters, less than 40 picoliters, less than 50 picoliters, etc. Jetting is one methodology of applying fusing agent or other fluid agents to a build material in accordance with the present disclosure.

As used herein, the term "about" is used to provide flexibility to a numerical range endpoint by providing that a given value may be "a little above" or "a little below" the endpoint. The degree of flexibility of this term can be dictated by the particular variable and determined based on experience and the associated description herein.

As used herein, a plurality of items, structural elements, compositional elements, and/or materials may be presented in a common list for convenience. However, these lists should be construed as though members of the list are individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include individual numerical values or sub-ranges encompassed within that range as if numerical values and sub-ranges are explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Such an interpretation should apply regardless of the breadth of the range or the characteristics being described.

EXAMPLES

The following illustrates examples of the present disclosure. However, it is to be understood that the following are only illustrative of the application of the principles of the present disclosure. Numerous modifications and alternative compositions, methods, and systems may be devised without departing from the spirit and scope of the present disclosure. The appended claims are intended to cover such modifications and arrangements.

Example 1—Preparation of Fusing Agents

Several fusing agents are prepared that are essentially colorless and which can generate sufficient heat for fusing of build material when exposed to electromagnetic energy at 365 nm or 395 nm. The formulations are provided in Tables 1-4 below:

TABLE 1

| Fusing Agent 1 (Triazine Radiation Absorber) | | |
| --- | --- | --- |
| Ingredient | Component Type | Wt % |
| 2,2'-[6-(4-Methoxyphenyl)-1,3,5-triazine-2,4-diyl]bis{5-[(2-ethylhexyl)oxy]phenol} (Bemotrizinol) | Triazine Radiation Absorber | 1-5 |
| Octyl Acetate, Heptanol, Ethanol, Diethylene Glycol Butyl Ether | Organic Cosolvent | 40-85 |
| polyoxyethylene-sorbitan-20 mono-oleate (Polysorbate 80) | Additives | 0.5-3 |
| DI Water | Solvent | Balance |

18

TABLE 2

| Fusing Agent 2 (Benzotriazole Radiation Absorber) | | |
| --- | --- | --- |
| Ingredient | Component Type | Wt % |
| 2-(2H-Benzotriazol-2-yl)-4-(1,1,3,3-tetramethylbutyl) phenol (Octrizole) | Benzotriazole Radiation Absorber | 1-5 |
| Octyl Acetate, Propylene Glycol, Glycerol, 1-Pentanol, Diethylene Glycol Butyl Ether | Organic Cosolvent | 40-85 |
| Disodium EDTA, Sodium Bicarbonate, Sodium Docusate | Additives | <0.3 |
| DI Water | Solvent | Balance |

TABLE 3

| Fusing Agent 3 (Terephthalylidene Dicamphor Sulfonic Acid Radiation Absorber) | | |
| --- | --- | --- |
| Ingredient | Component Type | Wt % |
| Terephthalylidene Dicamphor Sulfonic Acid (Ecampsule) | Terephthalylidene Dicamphor Sulfonic Acid Radiation Absorber | 1-5 |
| Propylene Glycol | Organic Cosolvent | 10-60 |
| Disodium EDTA, Sodium Bicarbonate, Sodium Docusate | Additives | <0.3 |
| DI Water | Solvent | Balance |

TABLE 4

| Fusing Agent 4 (Avobenzone Radiation Absorber) | | |
| --- | --- | --- |
| Ingredient | Component Type | Wt % |
| Avobenzone (D50 238 nm) | Avobenzone Radiation Absorber | 1-5 |
| Propylene Glycol and Isopropyl Alcohol | Organic Cosolvent | 30-85 |
| Disperbyk ® 190 and Tergitol ® 15-s-9 | Additives | 0.1-10 |
| DI Water | Solvent | Balance |

Disperbyk ® 190 is a high molecular weight block copolymer with pigment affinic groups, available from Byk (Altana Group) (China).
Tergitol ® 15-s-9 is a linear non-ionic surfactant that is a secondary ethoxylated alcohol, available from Dow (USA).

Fusing Agents 1-3 are prepared with a liquid vehicle that solubilizes the respective radiation absorbers in a liquid vehicle, which includes organic cosolvent, additives, and water. In the case of Fusing Agent 1, the Polysorbate 80 is used to assist with solubilization of the bemotrizinol and to ameliorate phase separation that may otherwise occur between more polar and more non-polar solvents.

Fusing Agent 4 is prepared by mixing avobenzone, propylene glycol, the Disperbyk®-190, and water, followed by milling for about 48 hours to disperse the avobenzone to achieve a D50 particle size from about 30 nm to about 1000 nm, e.g., 238 nm. The fusing agent can then be formulated by adding additional components, such as surfactant, isopropyl alcohol, etc., and/or by adding more of the same components, e.g., propylene glycol, water, etc.

All four (4) of these fusing agent formulations did not exhibit any significant negative effects on decap or nozzle health of the print head.

Example 2—Preparation of Three-dimensionally Printed Lens Elements

Fusing Agents 1-4 can be applied to thermoplastic polyamide elastomeric (TPA) particles and then heat fused using UV radiation to generate three-dimensionally printed lenses. Prior to application of the fusing agent to the powder bed of TPA build material, the powder bed is heated using a tungsten halogen heating lamp at a carriage speed of 20 inches per second to bring the temperature of the TPA to within about 20° C. of the melting temperature of the TPA, followed by application of the Fusing Agent at 6 inches per second.

In this specific example, with the powder bed warmed, e.g., on a layer-by-layer basis, the Fusing Agent 2 (with octrizole) was iteratively ejected using a thermal inkjet pen onto 100 μm layers of 100 wt % thermoplastic polyamide elastomeric particles at about 2 drops per pixel, which corresponds to 128 contone. The printed layer was exposed to UV radiation, and this process was repeated until a lens element was formed. Multiple lens elements were prepared, some using UV-LED light having a peak at 365 nm and some using UV-LED light having a peak at 395 nm, both at a power level of about 17 W/cm$^2$ and a dwell time set at about 0.5 seconds (carriage set at 6 inches per second). Upon printing and fusing, the area where fusing agent was applied melted into a fused lens element (printed and fused on a layer-by-layer basis) while the surrounding powder did not melt. In all three cases, the fusing agent was able to absorb enough UV energy to efficiently fuse the build material of TPA with considerable selectivity with the powder surrounding the part. The printed three-dimensional lens element also exhibited little to no evidence of part discoloration during the build process, leaving essentially three-dimensional printed objects that were transparent or translucent in color. The lens elements prepared were about 3 cm in diameter.

In some examples, coloring agent was added to the build material during the build to add a tint to the transparent or translucent lens element. The presence of coloring agent did not hinder the transparency or translucency of the lens element while providing a uniform tint to the lens element. Coloring agent can be applied at any contone level that causes from 0.001 wt % to about 1.3 wt % of colorant to the lens element. The amount applied can be greater for colors like yellow, and less for colors like cyan or black. Either way, colorant can be included provided the transparency or translucency is retained within acceptable parameters, e.g., transmission of the lens element at 10% or more.

The three-dimensional lens elements prepared were clear, yellow, orange, and blue. All of the lens elements had a relatively rough surface with some polymer particles remaining on the surface. The surface polymer was reflowed with a heat gun to form a smooth or glassy surface of the lens element.

What is claimed is:

1. A three-dimensional printing kit for forming a lens element, the three-dimensional printing kit comprising:
   a build material including from about 80 wt % to 100 wt % of thermoplastic polyamide elastomeric particles having a D50 particle size of from about 10 μm to about 150 μm; and
   a fusing agent separate from the build material and consisting of a liquid vehicle and from about 0.5 wt % to about 20 wt % of a UV radiation absorber having a D50 particle size of from about 30 nm to about 1000 nm,
   wherein the liquid vehicle consists of water and optionally an organic cosolvent, a non-ionic ethoxylated surfactant, or a combination thereof,
   and wherein the UV radiation absorber is:
      a triazine radiation absorber selected from the group consisting of 2,4-bis(2,4-dimethylphenyl)-6-(2-hydroxy-4-octyloxyphenyl)-1,3,5-triazine, 2,4-bis(2,4-dimethylphenyl)-6-(2-hydroxy-4-isooctyloxyphe-nyl)-1,3,5-triazine, 2,4-bis(2,4-dimethyl phenyl)-6-(2-hydroxy-4-methoxy phenyl)1,3,5-triazine, 2-(2-hydroxy-4-hexyloxyphenyl)-4,6-bis(phenyl)-1,3,5-triazine, 2-(2-hydroxy-4-methoxyphenyl)-4,6-bis (phenyl)-1,3,5-triazine, 2,4-bis(2-hydroxy-4-methoxyphenyl)-6-ethyl mercaptan-1,3,5-triazine, and 2,2'-[6-(4-methoxyphenyl)-1,3,5-triazine-2,4-diyl]bis{5-[(2-ethylhexyl)oxy]phenol}, and a combination thereof; or
   a benzotriazole radiation absorber selected from the group consisting of 2-(2H-benzotriazol-2-yl)-4-(1,1,3,3-tetramethylbutyl)phenol, 2-(2H-benzotriazol-2-yl)-4,6-bis(1-methyl-1-phenylethyl)phenol, 2-(2H-benzotriazol-2-yl)-4,6-bis(1-methyl-1-phenylethyl)phenol, 2-tert-butyl-6-(5-chloro-2H-benzotriazol-2-yl)-4-methylphenol, 2-(2H-benzotriazol-2-yl)-4,6-di-tert-pentylphenol, 2-(2H-benzotriazol-2-yl)-4,6-di-tert-pentylphenol, 2,2'-methylenebis[6-(2H-benzotriazol-2-yl)-4-(1,1,3,3-tetramethylbutyl) phenol], 2-(2H-benzotriazol-2-yl) -6-dodecyl-4-methylphenol, and a combination thereof; or
   terephthalylidene dicamphor sulfonic acid; or
   milled avobenzone particles.

2. The three-dimensional printing kit of claim 1, wherein the fusing agent exhibits an absorbance of from about 0.3 to about 2 at a wavelength from about 340 nm to about 415 nm.

3. The three-dimensional printing kit of claim 1, wherein the thermoplastic polyamide elastomeric particles have a melting temperature of from about 135° C. to about 210° C. and a weight average molecular weight of from about 100,000 Mw to about 500,000 Mw.

4. The three-dimensional printing kit of claim 1, further comprising:
   a coloring agent including a colorant to tint the lens element during a build; or
   a detailing agent including a detailing compound that reduces a temperature of the build material onto which the detailing agent is applied; or
   both the coloring agent and the detailing agent.

5. The three-dimensional printing kit of claim 1, wherein the UV radiation absorber is the triazine radiation absorber, or the benzotriazole radiation absorber, or terephthalylidene dicamphor sulfonic acid.

6. A three-dimensional printing system for forming a lens element, the three-dimensional printing system comprising:
   a fluid ejector loaded or loadable with a fusing agent to eject the fusing agent onto a powder bed of build material, the fusing agent separate from the build material and consisting of a liquid vehicle and from about 0.5 wt % to about 20 wt % of a UV radiation absorber having a D50 particle size of from about 30 nm to about 1000 nm, wherein the liquid vehicle consists of water and optionally an organic cosolvent an non-ionic ethoxylated surfactant, or a combination thereof, and wherein the UV radiation absorber is:
      a triazine radiation absorber selected from the group consisting of 2,4-bis(2,4-dimethylphenyl)-6-(2-hydroxy-4-octyloxyphenyl)-1,3,5-triazine, 2,4-bis(2,4-dimethylphenyl)-6-(2-hydroxy-4-isooctyloxyphe-nyl)-1,3,5-triazine, 2,4-bis(2,4-dimethyl phenyl)-6-(2-hydroxy-4-methoxy phenyl)1,3,5-triazine, 2-(2-hydroxy-4-hexyloxyphenyl)-4,6-bis(phenyl)-1,3,5-triazine, 2-(2-hydroxy-4-methoxyphenyl)-4,6-bis (phenyl)-1,3,5-triazine, 2,4-bis(2-hydroxy-4-methoxyphenyl)-6-ethyl mercaptan-1,3,5-triazine, and 2,2'-[6-(4-methoxyphenyl)-1,3,5-triazine-2,4-diyl]bis{5-[(2-ethylhexyl)oxy]phenol}, and a combination thereof; or a benzotriazole radiation absorber selected from the group consisting of 2-(2H-benzotriazol-2-yl)-4-(1,1,3,3-tetramethylbutyl)phenol, 2-(2H-benzotriazol-2-yl)-4,6-bis(1-methyl-1-phenylethyl)phenol, 2-(2H-benzotriazol-2-yl)-4,6-bis (1-methyl-1-phenylethyl)phenol, 2-tert-butyl-6-(5-chloro-2H-benzotriazol-2-yl)-4-methylphenol, 2-(2H-benzotriazol-2-yl)-4,6-di-tert-pentylphenol, 2-(2H -benzotriazol-2-yl)-4,6-di-tert-pentylphenol, 2,2'-methylenebis[6-(2H -benzotriazol-2-yl)-4-(1,1,3,3-tetramethylbutyl) phenol], 2-(2H-benzotriazol-2-yl) -6-dodecyl-4-methylphenol, and a combination thereof; or terephthalylidene dicamphor sulfonic acid; or milled avobenzone particles, wherein the fusing agent exhibits an absorbance of from about 0.3 to about 2 at a radiation wavelength of from about 340 nm to about 415 nm; and a UV energy source that emits electromagnetic radiation at an energy level of from about 2 W/cm$^2$ to about 50 W/cm$^2$, wherein the electromagnetic radiation includes the radiation wavelength.

7. The three-dimensional printing system of claim 6, further comprising a build material including from about 80 wt % to 100 wt % of thermoplastic polyamide elastomeric particles having a D50 particle size of from about 10 μm to about 150 μm.

8. A method for three-dimensional printing a lens element, the method comprising:

iteratively applying individual build material layers including from about 80 wt % to 100 wt % of thermoplastic polyamide elastomeric particles having a D50 particle size of from about 10 μm to about 150 μm to a powder bed;

based on a three-dimensional object model, iteratively and selectively dispensing a fusing agent onto the individual build material layers, wherein the fusing agent is separate from the build material and consists of includes an aqueous liquid vehicle and from about 0.5 wt % to about 20 wt % of a UV radiation absorber having a D50 particle size of from about 30 nm to about 1000 nm, wherein the liquid vehicle consists of water and optionally an organic cosolvent, a non-ionic ethoxylated surfactant, or a combination thereof, and wherein the UV radiation absorber is:

a triazine radiation absorber selected from the group consisting of 2,4-bis(2,4-dimethylphenyl)-6-(2-hydroxy-4-octyloxyphenyl)-1,3,5-triazine, 2,4-bis(2,4-dimethylphenyl)-6-(2-hydroxy-4-isooctyloxyphenyl)-1,3,5-triazine, 2,4-bis(2,4-dimethyl phenyl)-6-(2-hydroxy-4-methoxy phenyl)1,3,5-triazine, 2-(2-hydroxy-4-hexyloxyphenyl)-4,6-bis(phenyl)-1,3,5-triazine, 2-(2-hydroxy-4-methoxyphenyl)-4,6-bis (phenyl)-1,3,5-triazine, 2,4-bis(2-hydroxy-4-methoxyphenyl)-6-ethyl mercaptan-1,3,5-triazine, and 2,2'-[6-(4-methoxyphenyl)-1,3,5-triazine-2,4-diyl]bis{5-[(2-ethylhexyl)oxy]phenol}, and a combination thereof; or a benzotriazole radiation absorber selected from the group consisting of 2-(2H-benzotriazol-2-yl)-4-(1,1,3,3-tetramethylbutyl)phenol, 2-(2H-benzotriazol-2-yl)-4,6-bis(1-methyl-1-phenylethyl)phenol, 2-(2H-benzotriazol-2-yl)-4,6-bis(1-methyl-1-phenylethyl)phenol, 2-tert-butyl-6-(5-chloro-2H-benzotriazol-2-yl)-4-methylphenol, 2-(2H-benzotriazol-2- yl)-4,6-di-tert-pentylphenol, 2-(2H -benzotriazol-2-yl)-4,6-di-tert-pentylphenol, 2,2'-methylenebis[6-(2H -benzotriazol-2-yl)-4-(1,1,3,3-tetramethylbutyl) phenol], 2-(2H-benzotriazol-2-yl) -6-dodecyl-4-methylphenol, and a combination thereof; or terephthalylidene dicamphor sulfonic acid; or milled avobenzone particles, wherein the fusing agent exhibits an absorbance of from about 0.3 to about 2 at a radiation wavelength of from about 340 nm to about 415 nm; and iteratively exposing the powder bed to electromagnetic radiation that includes the radiation wavelength at an energy level of from about 2 W/cm$^2$ to about 50 W/cm$^2$ for a time duration of from about 0.1 second to about 10 seconds to selectively fuse the thermoplastic polyamide elastomeric particles in contact with the UV radiation absorber at the individual build material layers resulting in a transparent or translucent lens element.

9. The method of claim 8, further including iteratively and selectively dispensing a coloring agent including a colorant onto one or multiple individual build material layers, wherein the colorant is present in the transparent or translucent fused three-dimensional lens element in an amount of from about 0.001 wt % to about 1.3 wt %.

10. The method of claim 8, wherein the lens element is mechanically deformable.

11. The method of claim 8, further comprising finishing a surface of the lens element by:

thermally reflowing the surface of the lens element at depth of from about 50 um to about 1 mm and at a temperature at or above a glass transition temperature of the thermoplastic polyamide elastomer; or thermally reflowing the surface of the lens element at depth of from about 50 um to about 1 mm and at a temperature below a glass transition temperature of the thermoplastic polyamide elastomer in the presence of a finishing solvent that depresses the melting temperature of the thermoplastic polyamide elastomer; or polishing the surface of the lens element; or vapor phase treating the surface of the lens element; or a combination thereof.

12. A three-dimensionally printed lens element formed by the method of claim 8, the three-dimensionally printed lens element comprising multiple fused composite layers in the shape of a lens element having a total transmission of visible light of from about 10% to about 100%, the lens element being transparent or translucent to light and including from about 80 wt % to 99.9 wt % of a thermoplastic polyamide elastomer and from about 0.1 wt % to about 10 wt % of a UV radiation absorber carried by the thermoplastic polyamide elastomer.

13. The three-dimensionally printed lens element of claim 12, wherein the lens element includes from about 0.001 wt % to about 1.3 wt % of a colorant, wherein the lens element is tinted with the colorant but remains transparent or translucent.

14. The three-dimensionally printed lens element of claim 12, wherein the lens element is a plano-convex lens, a double-convex lens, an aspheric lens, a plano-concave lens, a double-concave lens, a positive achromatic lens, a positive cylinder lens, a plano-convex axicons, a ball lens, a rod lens, a cylinder lens, a Powell lens, or a Fresnel lens.

15. The three-dimensionally printed lens element of claim 12, wherein a surface of the lens element has been finished by:

thermally reflowing the surface of the lens element at
    depth of from about 50 μm to about 1 mm and at a
    temperature at or above a glass transition temperature
    of the thermoplastic polyamide elastomer; or
thermally reflowing the surface of the lens element at
    depth of from about 50 μm to about 1 mm and at a
    temperature below a glass transition temperature of the
    thermoplastic polyamide elastomer in the presence of a
    finishing solvent that depresses the melting temperature
    of the thermoplastic polyamide elastomer; or
polishing the surface of the lens element; or
vapor phase treating the surface of the lens element; or
a combination thereof.

\* \* \* \* \*